United States Patent [19]
Gravois

[11] Patent Number: 5,924,495
[45] Date of Patent: Jul. 20, 1999

[54] APPARATUS AND METHOD FOR REMOVAL OF SURFACE DEBRIS FROM CROP ROWS

[76] Inventor: Dean A. Gravois, 21222 LA 20 West, Vacherie, La. 70090

[21] Appl. No.: 08/822,984

[22] Filed: Mar. 21, 1997

[51] Int. Cl.[6] .......................... A01B 39/08; A01B 39/22; A01B 79/00
[52] U.S. Cl. ......................................... 172/39; 15/256.52
[58] Field of Search .................. 172/28, 39, 62, 172/189, 534; 015/256.5, 256.51, 256.52, 82, 87, 79.2, 3.1

[56] References Cited

U.S. PATENT DOCUMENTS

| | | |
|---|---|---|
| 1,108,319 | 8/1914 | Bell . |
| 1,132,152 | 3/1915 | Bell . |
| 2,229,229 | 1/1941 | Wagner ........................................ 15/82 |
| 2,229,230 | 1/1941 | Wagner ........................................ 15/82 |
| 2,235,277 | 3/1941 | Bradley ........................................ 15/82 |
| 2,248,012 | 7/1941 | Phillips ........................................ 15/82 |
| 2,706,941 | 4/1955 | Swanson .................................... 97/227 |
| 3,125,844 | 3/1964 | Beyer ........................................... 56/27 |
| 3,837,030 | 9/1974 | Liebrecht .................................... 15/82 |
| 4,211,284 | 7/1980 | Collado .................................... 172/151 |
| 4,989,676 | 2/1991 | Rogers ..................................... 172/438 |
| 5,018,587 | 5/1991 | Gandrud et al. ......................... 172/612 |
| 5,076,180 | 12/1991 | Scheider .................................. 111/139 |
| 5,076,367 | 12/1991 | Reincke .................................. 172/123 |
| 5,240,085 | 8/1993 | Klossner et al. ...................... 172/98 X |
| 5,667,019 | 9/1997 | Reincke ................................. 172/49.5 |

*Primary Examiner*—Christopher J. Novosad
*Attorney, Agent, or Firm*—Roy, Kiesel & Tucker

[57] ABSTRACT

An apparatus for cleaning debris from the surface of crop rows without substantially damaging the growing crop having a wheeled frame attachable to a pulling vehicle, the wheels positioned to avoid a growing crop, at least one journalled rotatable shaft attached to the frame, at least one brush positioned A each rotatable shaft, each brush having a plurality of bristles, and a power transfer member operatively connected to the rotatable shaft to transfer power from the pulling vehicle to the shaft.

46 Claims, 4 Drawing Sheets

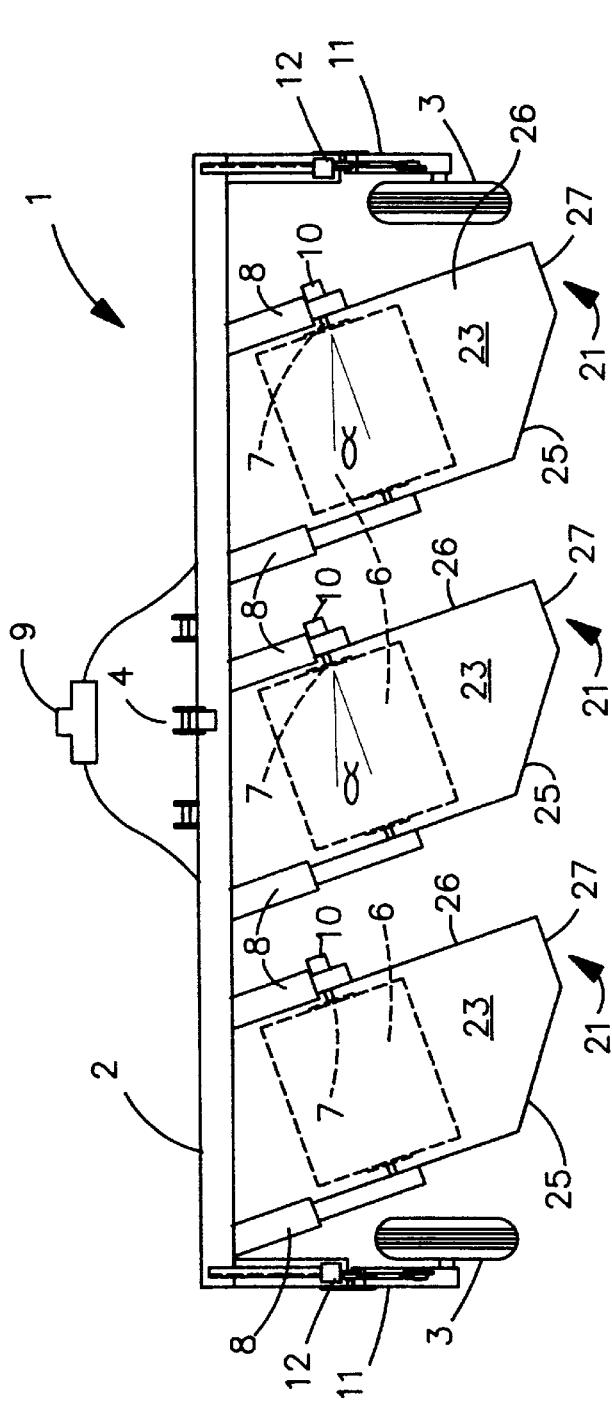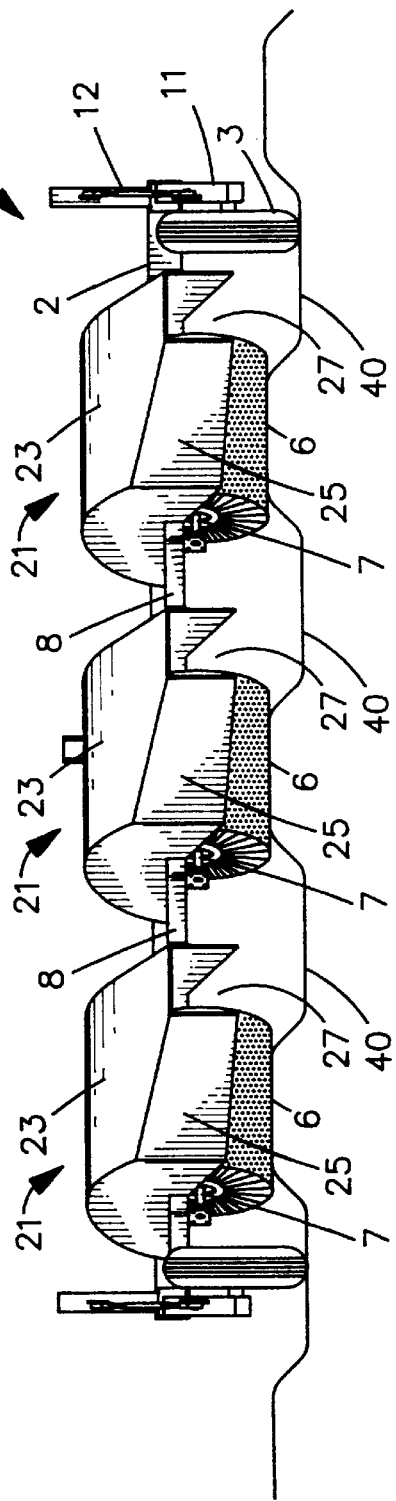

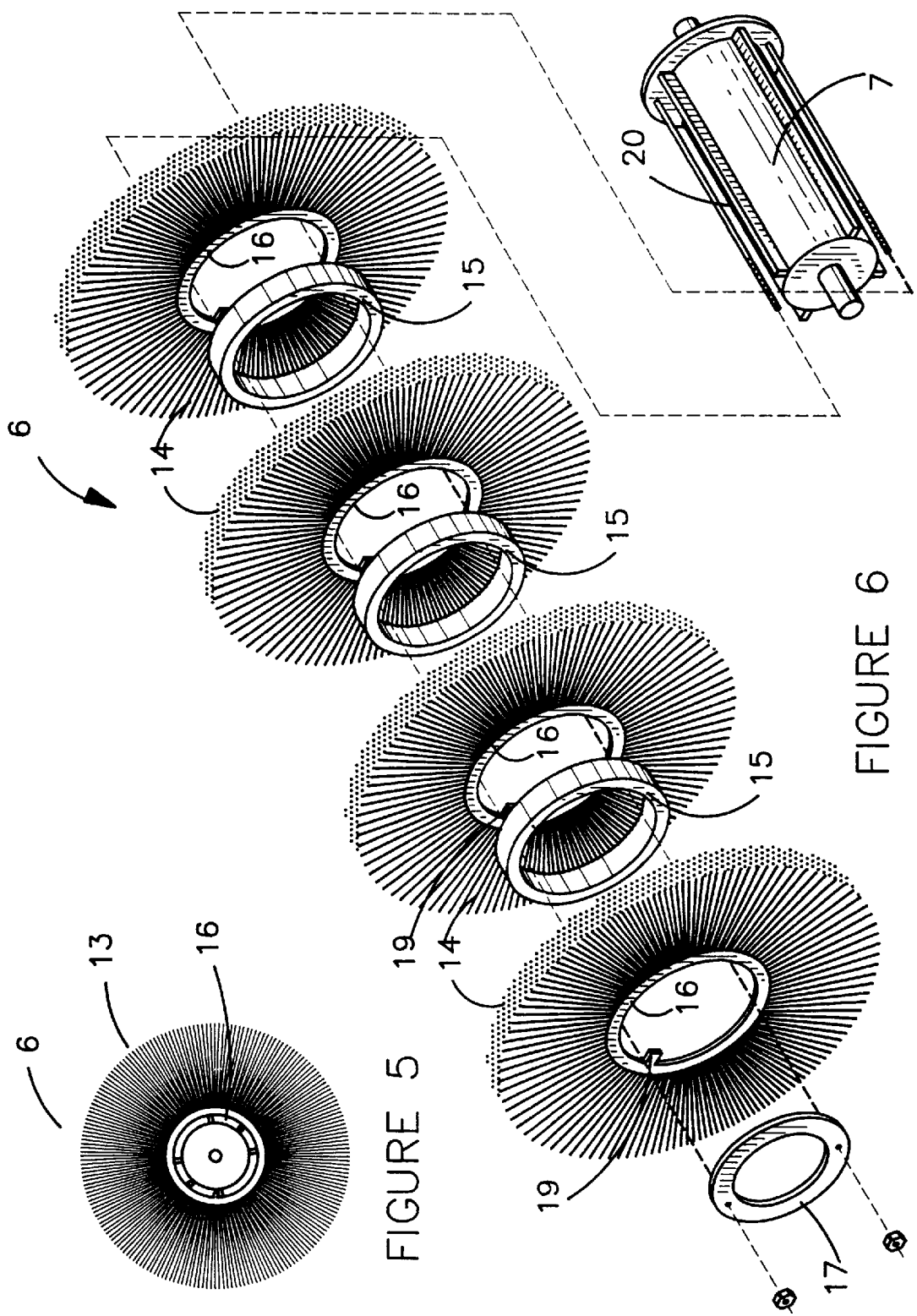

APPARATUS AND METHOD FOR REMOVAL OF SURFACE DEBRIS FROM CROP ROWS

BACKGROUND OF THE INVENTION

I. Field of the Invention

The present invention relates generally to devices for removing debris from crop rows, and more particularly, from sugar cane rows.

II. Description of Prior Art

Sugar cane is grown in raised rows; generally, each row is about 30 inches across. Between each row runs a furrow. The distance between rows in Louisiana is about 72 inches.

The harvesting process removes the stalk of the cane, but leaves the root of the plant untouched. The next season's crop will be generated from the roots of the prior crop. When sugar cane is harvested, debris from the harvested crop, generally sugar cane leaves, is left in the field. This debris is considered beneficial to the next crop, providing mulch and protecting the roots from frost or freezes, and sprouting plants from late season frosts or freezes. However, after the last frost, the debris is considered undesirable. The debris smothers young sprouting plants, preventing sufficient sunlight from reaching the shoot, resulting in weak and slow growing plants. Additionally, after the last freeze, cane farmers fertilize the fields in a process which generally digs small channels down each row, one on each side of the plants, into which channels granular or liquid fertilizers are deposited. When debris is left on the fields, this fertilization process is ineffective, as it is difficult to create a "clean" channel. If this channel is filled with debris, the fertilizer is less effective as less reaches the soil and ultimately, the root system of the growing plants.

To remove the debris, farmers usually burn the debris off the fields. Burning the fields can result in serious problems for the farmer: (1) the young spouting plants can be seriously damaged; (2) local and state environmental agencies are increasing questioning the environmental soundness of burning cane fields, and in some instances, have banned the burning of fields. Additionally, burning debris can create unanticipated damages resulting in additional liabilities for the farmer.

SUMMARY OF THE INVENTION

Disclosed herein is an apparatus for cleaning debris from the surface of crop rows without substantially damaging growing young crops. The apparatus has a wheeled frame attachable to a pulling vehicle, such as a tractor, where the wheels are positioned to avoid the growing row of crops when the apparatus is pulled down a crop row. The apparatus has at least one journalled rotatable shaft attached to the frame, and at least one brush positioned on each of the rotatable shafts, each brush having a plurality of bristles. The device also has a power transfer means operatively connected to each of the rotatable shaft to transfer power from the pulling vehicle to each of the shafts.

It is therefore an object of this invention to provide a device which can remove debris from rows of plants without burning the debris.

It is another object of this invention to provide a device which can remove debris from rows of plants without harmful effects on the environment.

It is also an object of this invention to provide a device for removing debris from rows of plants without substantially damaging growing shoots.

It is also an object of the present invention to clean the rows and leave the debris in the furrows.

It is a further object of this invention to provide a device for removing debris which can be attached to a tractor.

Yet another object of this invention is to provide a device for cleaning debris from crop rows which can be efficiently and economically operated.

These and other objects and advantages of the present invention will no doubt become apparent to those skilled in the art after having read the following description of the preferred embodiment which are contained in and illustrated by the various drawing figures.

BRIEF DESCRIPTION OF THE DRAWINGS

FIG. 3 is a top schematic view of one embodiment of the invention.

FIG. 4 is a back perspective view of one embodiment of the invention.

FIG. 5 is a side view of a brush member.

FIG. 6 is an exploded view of the shaft and brush members.

DETAILED DESCRIPTION OF THE PREFERRED EMBODIMENT

Figure 1:
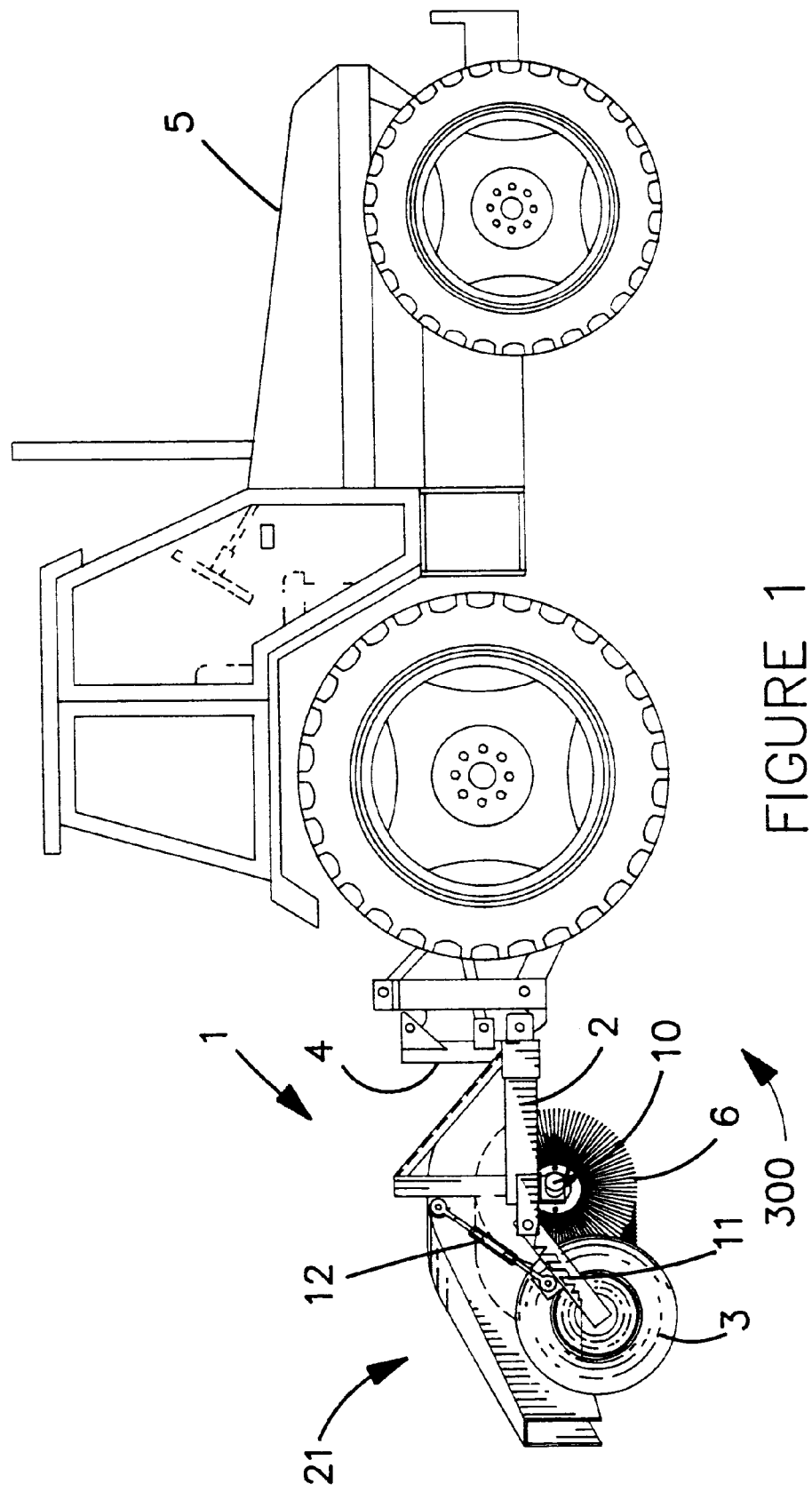
FIG. 1 is a right side prospective view of one embodiment of the invention attached to a pulling vehicle.

In the drawings many details pertaining to fabrication and maintenance utility well established in the machine construction art and not bearing upon points of novelty are omitted in the interest of descriptive clarity and efficiency. Such details may include threaded connections, lockrings, shear pins, weld lines and the like. Oil filling and vent ports are not shown and wiring galleries for such as solenoids are essential to overall function but are matters of designer's choice, are not claimed and, hence, not shown.

Shown in FIG. 1 is the apparatus 1 for cleaning rows of crops. The embodiment shown is designed to clean three rows of crops simultaneously. See FIGS. 3 and 4. Single row, double row, or other configurations are of similar construction. The apparatus 1 has a frame 2 having wheels 3. Frame 2 has a rear section 4 adapted to be attached to a pulling vehicle. In the embodiment shown, the rear section 4 is adapted to engage a standard pulling vehicle coupling device, such as a three point hitch quick connect. The height of the rear section 4 of the frame 2 may be adjusted by movement of the coupling device, such as by adjusting the third point of the quick hitch. The coupling device may also be used to adjust the tilt the frame 2 makes with a vertical plane. Both adjustments will impact the way the apparatus 1 is positioned with respect to the ground. As shown, wheels 3 are not joined to one another by an axle; in this fashion, cylindrical brush 6, described in detail later, may spin without interfere with such an axle. As shown in FIG. 4, wheels 7 are designed to ride in furrows 40, with brushes 6 riding on the surface of the crop rows. Each cylindrical brush 6 is positioned on a shaft 7, with each shaft 7 journalled for rotative movement in support arms 8. Cylindrical brush 6 itself may be integral with shaft 7, or form the shaft 7. As shown, each shaft 7 is supported by two support arms 8. However, center shafts 7 may share support arms 8 with adjacent shafts 7 (not shown). Shown in FIG. 3 is a power transfer means 9 positioned on the pulling vehicle 5 (or positioned on apparatus 1 (not shown)), to transfer power from the pulling vehicle 5 to the individual shafts 7. As shown, power transfer means 9 is a hydraulic master pump powered by the PTO, and a number of hydraulic motors 10, one per shaft 7, and mounted to rotate the shaft 7. FIG. 3 shows the hydraulic motors 10 as mounted on the right hand side of each shaft 7. To reduce needed lengths of hydraulic hoses, the right most shaft 7 may have the motor 10 mounted on the left hand side of the shaft 7.

A suitable pump is manufactured by Commercial Pump, model P3650598CFA2, pumping at 32 gal./min. Suitable hydraulic motors are manufactured by Char-Lynn Hydraulics, no. 101-1004, generating 2500 ft-lbs of torque at 15 gal./min. In a three sweep embodiment, the hydraulic output of the pump is fed into a 66/33 flow divider, and the output of the 66 side of that flow divider is sent to a 50/50 flow divider. Consequently, three (0.33)×(35 gal/min) lines are created, one to feed each motor. The flow dividers, hydraulic lines, and hydraulic reservoirs are not shown in the figures.

Alternative means of transferring power from the pulling vehicle 5 to the shafts 7 are possible. For instance, power transfer means 9 may be simply a hydraulic line run from the pulling vehicle's hydraulic system to shafts 7 (suitable for a single brush embodiment). Alternatively, power transfer means 9 may include mechanical linkage from the PTO to the shafts 7, such as by use of transaxles, chains and sprockets. Mechanical transference of power is not preferred, as the apparatus 1 in operation generates airborne dust, making maintenance of a mechanical transfer mechanism onerous. Finally, the apparatus 1 may have an independent power means to transfer power from the power means to the shafts 7, such as by use of gasoline or diesel engines mounted on the frame and mechanically connected to the shafts 7 or to power larger capacity pumps, or engines mounted directly onto each shaft 7 (not shown).

Wheel height is adjustable with respect to a fixed horizontal plane through the frame 2. As shown, wheels 3 are attached to frame 2 by a wheel arm 11 which is rotatively mounted to frame 2. Connected between wheel arm 11 and frame 2 is turnbuckle 12, which is used to adjust wheel height. Other means of adjusting wheel height are well known to those in the arts, such as hydraulic cylinders.

Brushes 6 may make an angle α in a horizontal plane with respect to the rear section 4 of the frame. For instance, typical cane fields have row tops of about 30 inches across, furrows of about 3.5 feet, furrow depth (with respect to row tops) of about 10–12 inches. In this field configuration, a brush diameter of 32 inches mounted at an angle α of about 22 degrees has been found suitable. Other angles may be used, and the apparatus 1 may incorporate means to adjust the angle α, such as a movable mount for one journalled end of shaft 7, or by having the support arms 8 made adjustable, such as by using telescoping arms or support arms 8 slidably mounted on the frame.

The height of the brush 6 above the frame 2 may also be adjustable, such as with pivotal support arms 8 (not shown). This extra height adjustment generates additional mechanical complexity, and it has been found that sufficient flexibility of height adjustments for the apparatus can be made by adjusting the frame height and tilt through the coupling device attachment point, and by adjusting the wheel height.

Brush 6 is a series of bristles 13 radiating outwardly. In the shown embodiment, the brush 6 is composed of a series of brush members 14, with spacers 15 therebetween, both mounted on shaft 7. Brush members 14 have a series of bristles 13 extending outwardly from a center ring 16. One type of brush 6 found suitable is a 10 inch inner circumferential diameter ring, with 11 inch bristles (available from State Machinery in Kenner, La. as a 10×32 polywafer). These brushes have bristles which are 0.076 inch diameter rigid polypropylene. The center ring 16 of the brush member 14 is about ½ inch thickness. The brush 6 itself is composed of a plurality of brush members 14 with 1 inch spacers 15 therebetween. Other configurations may be needed to accommodate debris type or debris characteristics (such as thickness or density) such as wider spacers or elimination of spacers thereby modifying the number of brush members, larger or smaller diameter circular brushes, altering the density of the bristles on each circular brush, or modification of the thickness or rigidity characteristics of the bristles. Alternatively, the turning rate of the shafts (RPM's) may be modified or pulling vehicle speed modified to accommodate differing debris characteristics. For instance, 300 RPM's with the pulling vehicle moving at 3.5 to 4 mph has been found sufficient to clean Louisiana cane fields with a three or four months buildup of debris. The spacers 15 are placed in the apparatus 1 to reduce the density of bristles 13 contacting the surface of the ground. The density of bristles 13 should be sufficient to allow for the loose debris to be moved without damaging the rooted shoots. In part, the ability to prevent damage to the shoot results from the use of bristle material that allows for some flex in the bristles 13 upon contact with the ground. If the bristles are too rigid (such as 0.25 inch steel bristles), they could dig into the ground and uproot the young plants.

In the embodiment shown, brush members 14 may be changed by detaching the mounting flange 17, detaching the mounting flange end of the shaft 7 from the support arm 8, lowering the shaft 7, and slipping the brush members 14 off of the shaft 7. To prevent brush members 14 from freely rotating on shaft 7, each brush member 14 has a slot 19 which is keyed into an area 20 of the shaft.

Finally, the apparatus 1 must have a hood 21 to help divert the loose material picked up by the rotating brush 6 into a desired spot, such as a furrow 40 (as shown in FIG. 4). Once in the furrow 40, the debris may be disked into the soil, providing nutrients. In the embodiment shown, each brush 6 has an associated hood 21, however, a single hood could also be used. The hoods 21 shown have a top 23, non-discharge side 25, and a discharge side 26. The hood 21 is attached to the frame 2 and positioned to encompass from about ¼ to about ½ of the upper portion of the brush 6. The top 23 is curved above the brush 6 to reflect the curvature of the brush 6. The top 23, however, is not adjacent to the top of the brush 6: a gap should be left between the top surface of the brush 6 and the top 23 of the hood 21. Such a gap (approximately 6–7 inches has been found suitable) enables airborne debris to pass over the brush 6 and exit through the discharge opening 27. The gap also allows a draft to form by action of the spinning brush 6 and hood 21, thereby directing airborne debris away from the cleaned row and moving the airborne debris rearwardly and out of the discharge opening 27. The non-discharge side 25 extends outward past the brush 6 and then angles toward the discharge side 26, but terminates prior to reaching the discharge side 26, thus leaving a discharge opening 27 for discharge of flying debris. The opening 27 should be placed to discharge in a desired location, such as near furrow 40.

Figure 2:
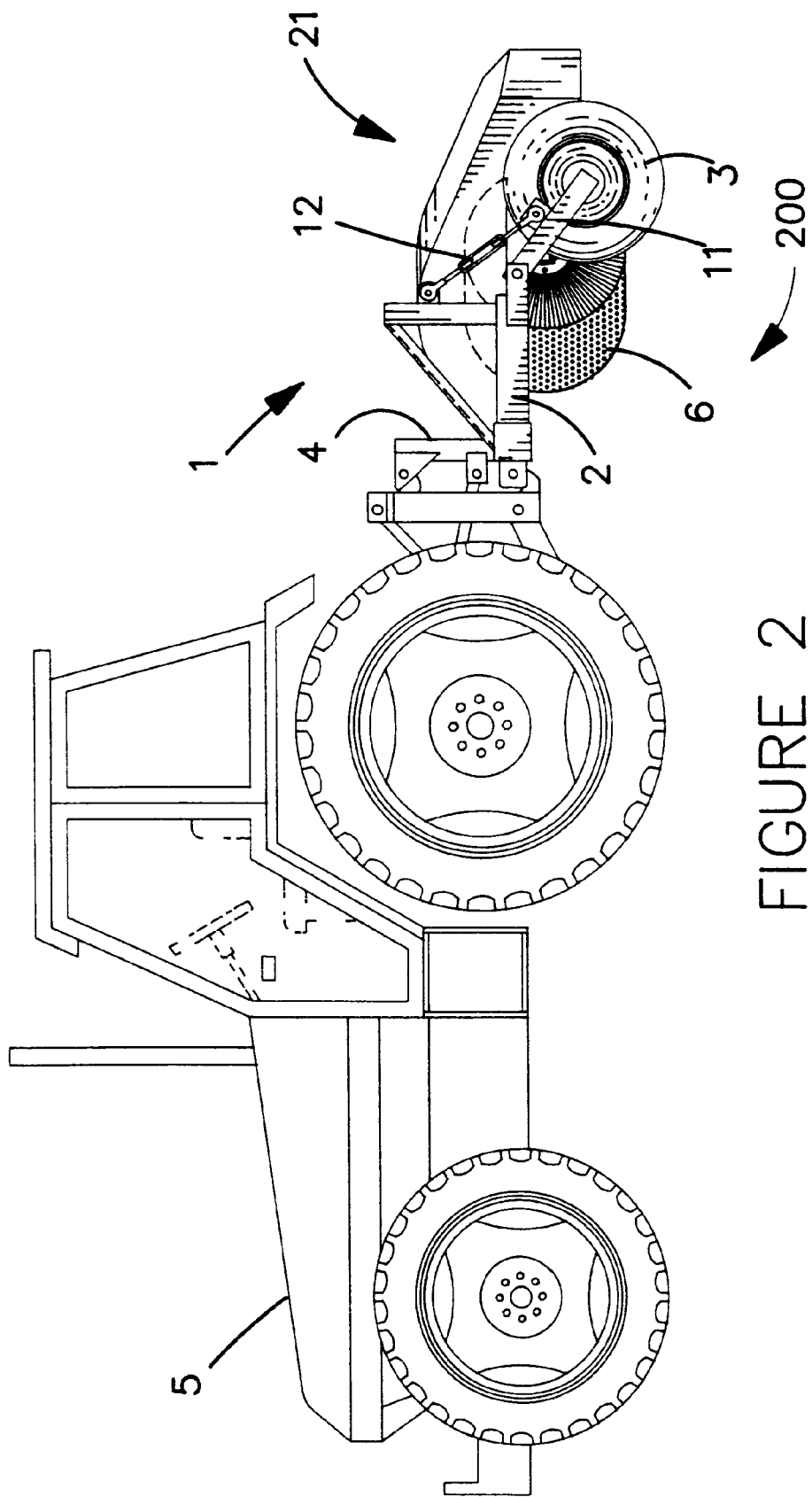
FIG. 2 is a left side prospective view of one embodiment of the attached to a pulling vehicle.

In operation, the apparatus 1 is attached to the pulling vehicle 5, and coupling device and wheel height adjusted so that tips of the bristles 16 on the brush 6 are in slight contact with the ground surface on the top of the row, or just above a clear ground surface. This height can be modified to accommodate wet debris, that is, the brush 6 can be further lowered to enable more of the bristle ends to strike and pick up debris. After proper adjustment, the apparatus is pulled down the rows, with the brushes spinning. It is preferred that the brushes 6 spin clockwise, as shown by arrow 200, when viewed from the left side of the apparatus, as shown in FIG. 2, and that the brushes 6 spin counterclockwise, as shown by arrow 300 when viewed from the right side of the apparatus, as shown in FIG. 1. As the brush 6 spins, debris is moved ahead of the bottom edge of the brush 6, and hence into the furrows 40, or the debris is flung up into the air. Once airborne, the spinning brush 6 and hood 21 cooperate to create a draft to direct the airborne debris rearwardly to be ejected out of the discharge opening 27.

Although the present invention has been described in terms of specific embodiments, it is anticipated that alterations and modifications thereof will no doubt become apparent to those skilled in the art. It is therefore intended that the following claims be interpreted as covering all such alterations and modifications that fall within the true spirit and scope of the invention.

I claim:

1. An apparatus for cleaning debris from the surface of crop rows without substantially damaging young growing crops comprising:
   (1) a frame attachable to a pulling vehicle, said frame having at least one wheel attached thereto, said at least one wheel positioned to avoid a growing crop on said crop rows;
   (2) at least one journalled rotatable shaft attached to said frame;
   (3) at least one brush positioned on said at least one rotatable shaft, said at least one brush having a plurality of bristles;
   (4) a power transfer member operatively connected to said at least one rotatable shaft to transfer power from said pulling vehicle to said at least one rotatable shaft; and,
   (5) at least one hood attached to said frame, said at least one hood having a discharge opening, said at least one hood positioned above said at least one brush and partially encasing said at least one brush so that said at least one brush and said at least one hood cooperate when said at least one rotatable shaft is rotating to create a draft to direct airborne debris out said discharge opening.

2. The apparatus according to claim 1 further having a wheel adjustment member to adjust the height of said at least one wheel with respect to said frame.

3. The apparatus according to claim 1 further having a first shaft adjustment assembly to adjust the position of said at least one rotatable shaft with respect to the ground.

4. The apparatus according to claim 1 wherein said frame has a rear section, and said at least one rotatable shaft is mounted on said frame at an angle to said rear section.

5. The apparatus according to claim 4 wherein said angle is approximately 22 degrees.

6. The apparatus according to claim 1 wherein said at least one hood further has a top, a discharge side, and a non-discharge side forming a cavity, said at least one brush being partially disposed in said cavity.

7. The apparatus according to claim 6 wherein said discharge side and said non-discharge side form said discharge opening therebetween.

8. The apparatus according to claim 1 wherein said at least one brush comprises a plurality of circular brush members.

9. The apparatus according to claim 1 wherein said bristles are composed of polypropylene.

10. The apparatus according to claim 1 wherein said bristles have ends, and said bristles are sufficiently flexible to allow young plants to pass through said bristles when said bristles are rotating about said at least one rotatable shaft and contacting the surface of a row of crops, substantially undamaged.

11. The apparatus according to claim 1 wherein said bristles have ends distal from said at least one rotatable shaft and the density of said ends is sufficiently great so that when said ends are close to the surface of a crop row, they allow debris located on said surface to be moved by said ends when said bristles are rotating about said at least one rotatable shaft and contacting the surface or a row of crops, but leaving substantially undamaged the young growing crops.

12. An apparatus for cleaning debris from the surface of crop rows without substantially damaging young growing crops comprising:
   (1) a frame attachable to a pulling vehicle, said frame having at least one wheel attached thereto, said at least one wheel positioned to avoid a growing crop on said crop rows;
   (2) at least one journalled rotatable shaft attached to said frame;
   (3) at least one brush positioned on said at least one rotatable shaft, said at least one brush having a plurality of bristles;
   (4) a power transfer member to rotate said at least one rotatable shaft; and,
   (5) at least one hood attached to said frame, said at least one hood having a discharge opening, said at least one hood positioned above said at least one brush and partially encasing said at least one brush so that said at least one brush and said at least one hood cooperate when said at least one rotatable shaft is rotating to create a draft to direct airborne debris out said discharge opening.

13. The apparatus according to claim 12 further having a wheel adjustment member to adjust the height of said at least one wheel with respect to said frame.

14. The apparatus according to claim 12 further having a first shaft adjustment assembly to adjust the position of said at least one rotatable shaft with respect to the ground.

15. The apparatus according to claim 12 wherein said frame has a rear section and said at least one rotatable shaft is mounted on said frame at an angle to said rear section.

16. The apparatus according to claim 15 wherein said angle is approximately 22 degrees.

17. The apparatus according to claim 12 wherein said at least one brush comprises a plurality of circular brush members.

18. The apparatus according to claim 12 wherein said bristles are composed of polypropylene.

19. The apparatus according to claim 12 wherein said bristles have ends distal from said at least one rotatable shaft and the density of said ends is sufficiently great so that when said ends are close to the surface of a crop row, they allow debris located on said surface to be moved by said ends when said bristles are rotating about said at least one rotatable shaft and contacting the surface or a row of crops, but leaving substantially undamaged the young growing crops.

20. The apparatus according to claim 12 wherein said bristles have ends, and said bristles are sufficiently flexible to allow young plants to pass through said bristles when said bristles are rotating about said at least one rotatable shaft and contacting the surface of a row of crops, substantially undamaged.

21. The apparatus according to claim 12 wherein said at least one hood further has a top, a discharge side, and a non-discharge side forming a cavity, said at least one brush being partially disposed in said cavity.

22. The apparatus according to claim 21 wherein said discharge side and said non-discharge side form said discharge opening therebetween.

23. A method of cleaning rows of crops comprising:
   (1) providing a pulling vehicle and an apparatus for cleaning the surface of crop rows comprising
      (a) a frame attachable to a pulling vehicle, said frame having at least one wheel attached thereto, said at least one wheel positioned to avoid a growing crop on said crop rows;
      (b) at least one journalled rotatable shaft attached to said frame;
      (c) at least one brush positioned on said at least one rotatable shaft, said at least one brush having a plurality of bristles, said bristles having ends distant from said at least one rotatable shaft; and,
      (d) a power transfer member to rotate said at least one rotatable shaft;
   (2) attaching said pulling vehicle to said apparatus;
   (3) positioning said at least one brush so that bristle ends are positioned near the surface of said crop rows; and
   (4) rotating said at least one rotatable shaft thereby turning said at least one brush and sweeping the surface of said crop rows.

24. The method of cleaning crop rows according to claim 23 wherein said frame further has at least one hood, said at least one hood having a discharge opening, said at least one hood positioned above said at least one brush and said at least one hood cooperate when said at least one rotatable shaft is rotating to create a draft to direct airborne debris out said discharge opening.

25. An apparatus for cleaning debris from the surface of crop rows without substantially damaging young growing crops comprising:
   (1) a frame attachable to a pulling vehicle, said frame having at least one wheel attached thereto, said at least one wheel positioned to avoid a growing crop on said crop rows;
   (2) at least one journalled rotatable shaft attached to said frame;
   (3) at least one brush positioned on said at least one rotatable shaft, said at least one brush having a plurality of bristles; and,
   (4) a power transfer member operatively connected to said at least one rotatable shaft to transfer power from said pulling vehicle to said at least one rotatable shaft;
   wherein said bristles have ends, and said bristles are sufficiently flexible to allow young plants to pass through said bristles when said bristles are rotating about said at least one rotatable shaft and contacting the surface of a row of crops, substantially undamaged.

26. The apparatus according to claim 25 further having a wheel adjustment member to adjust the height of said at least one wheel with respect to said frame.

27. The apparatus according to claim 25 further having a first shaft adjustment assembly to adjust the position of said at least one rotatable shaft with respect to the ground.

28. The apparatus according to claim 25 wherein said frame has a rear section, and said at least one rotatable shaft is mounted on said frame at an angle to said rear section.

29. The apparatus according to claim 28 wherein said angle is approximately 22 degrees.

30. The apparatus according to claim 25 further having at least one hood, said at least one hood attached to said frame and positioned above said at least one brush and partially encasing said at least one brush so that said at least one brush and said at least one hood cooperate when said at least one rotatable shaft is rotating to create a draft to direct airborne debris out a discharge opening.

31. The apparatus according to claim 30 wherein said at least one hood further has a top, a discharge side, and a non-discharge side forming a cavity said at least one brush being partially disposed in said cavity.

32. The apparatus according to claim 31 wherein said discharge side and said non-discharge side form said discharge opening therebetween.

33. The apparatus according to claim 25 wherein said at least one brush comprises a plurality of circular brush members.

34. The apparatus according to claim 25 wherein said bristles are composed of polypropylene.

35. The apparatus according to claim 25 wherein said bristles have ends distal from said at least one rotatable shaft and the density of said ends is sufficiently great so that when said ends are close to the surface of a crop row, they allow debris located on said surface to be moved by said ends when said bristles are rotating about said at least rotatable shaft and contacting the surface of a row of crops, but leaving substantially undamaged the young plants.

36. An apparatus for cleaning debris from the surface of crop rows without substantially damaging young growing crops comprising:
   (1) a frame attachable to a pulling vehicle, said frame having at least one wheel attached thereto, said at least one wheel positioned to avoid a growing crop on said crop rows;
   (2) at least one journalled rotatable shaft attached to said frame;
   (3) at least one brush positioned on said at least one rotatable shaft, said at least one brush having a plurality of bristles; and,
   (4) a power transfer member operatively connected to said at least one rotatable shaft to transfer power from said pulling vehicle to said at least one rotatable shaft;
   wherein said bristles have ends distal from said at least one rotatable shaft and the density of said ends is sufficiently great so that when said ends are close to the surface of a crop row, they allow debris located on said surface to be moved by said ends when said bristles are rotating about said at least one rotatable shaft and contacting the surface of a row of crops, but leaving substantially undamaged the young growing crops.

37. The apparatus according to claim further having a wheel adjustment member to adjust the height of said at least one wheel with respect to said frame.

38. The apparatus according to claim 36 further having a first shaft adjustment assembly to adjust the position of said at least one rotatable shaft with respect to the ground.

39. The apparatus according to claim 36 wherein said frame has a rear section, and said at least one rotatable shaft is mounted on said frame at an angle to said rear section.

40. The apparatus according to claim 39 wherein said angle is approximately 22 degrees.

41. The apparatus according to claim 36 further having at least one hood, said at least one hood attached to said frame, said at least one hood further having a discharge opening, said at least one hood positioned above said at least one brush and partially encasing said at least one brush so that said at least one brush and said at least one hood cooperate when said at least one rotatable shaft is rotating to create a draft to direct airborne debris out said discharge opening.

42. The apparatus according to claim 41 wherein said at least one hood further has a top, a discharge side, and a non-discharge side forming a cavity, said at least one brush being partially disposed in said cavity.

43. The apparatus according to claim 42 wherein said at least one discharge side and said non-discharge side form said discharge opening therebetween.

44. The apparatus according to claim 36 wherein said at least one brush comprises a plurality of circular brush members.

45. The apparatus according to claim 36 wherein said bristles are composed of polypropylene.

46. The apparatus according to claim 36 wherein said bristles have ends, and said bristles are sufficiently flexible to allow young plants to pass through said bristles when said bristles are rotating about said at least one rotatable shaft and contacting the surface of a row of crops, substantially undamaged.

* * * * *